United States Patent [19]

Ueno et al.

[11] Patent Number: 4,744,620
[45] Date of Patent: May 17, 1988

[54] OPTICAL COUPLER

[75] Inventors: Hiroshi Ueno; Hisami Nishi, both of Nishinomiya; Minoru Toyama, Takarazuka, all of Japan

[73] Assignee: Nippon Sheet Glass Co., Ltd., Hyogo, Japan

[21] Appl. No.: 789,780

[22] Filed: Oct. 21, 1985

[30] Foreign Application Priority Data

Oct. 30, 1984 [JP] Japan .................................. 59-228818

[51] Int. Cl.[4] .............................................. G02B 6/32
[52] U.S. Cl. .................................... 350/96.18; 350/413
[58] Field of Search ................... 350/96.15, 96.18, 413

[56] References Cited

U.S. PATENT DOCUMENTS

| | | | |
|---|---|---|---|
| 4,634,233 | 1/1987 | Usami et al. | 350/413 |
| 4,639,094 | 1/1987 | Aono | 350/413 |
| 4,640,585 | 2/1987 | Nojiri | 350/413 |
| 4,643,535 | 2/1987 | Ichikawa et al. | 350/413 |
| 4,647,159 | 3/1987 | Baba | 350/413 |

FOREIGN PATENT DOCUMENTS 6354  1/1980  Japan .................................. 350/413

*Primary Examiner*—James W. Davie
*Assistant Examiner*—Frank González
*Attorney, Agent, or Firm*—Dennis J. Williamson

[57] ABSTRACT

An optical coupler comprises a lens for coupling a light source and an optical fiber wherein the lens comprises a transparent column in which a refractive index $n(r)$ at a distance $r$ from an optical axis is expressed by $n^2(r)=n_0^2\{1-(gr)^2+h_4(gr)^4+h_6(gr)^6+h_8(gr)^8+ \ldots\}$, and satisfies the following conditions when $Sf=g/0.3$:

$$0<C_1/Sf<0.67$$

$$C_2=0$$

$$0\leq l_1\cdot Sf \leq 1.5$$

$$0.5\leq h_4 \leq 2.0$$

wherein $C_1$ and $C_2$ are curvatures of input and output end faces (the sign is positive when the center of the radius of curvature is positioned at the side of the optical fiber with respect to the end face), $l_1$ is a back focus at the side of the light source, $n_0$ is a refractive index on the optical axis, and $g$, $h_4$, $h_6$ and $h_8$ are distribution constants.

3 Claims, 4 Drawing Sheets

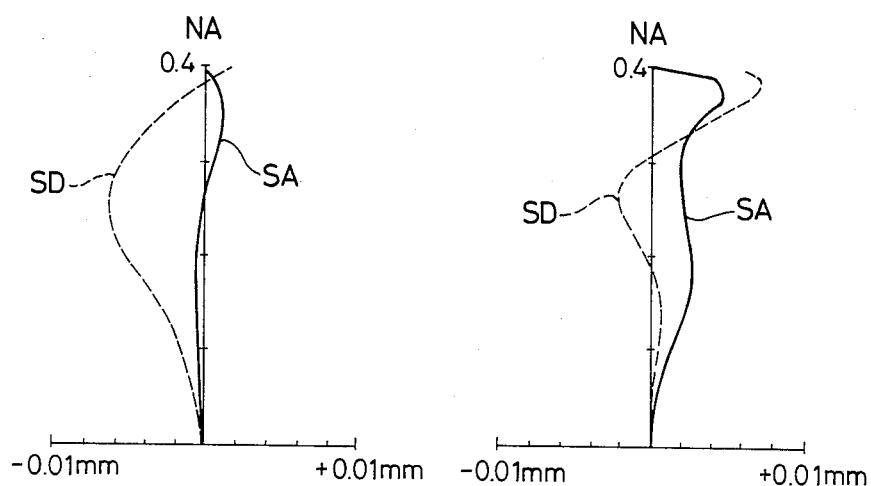
FIG. 10
FIG. 11
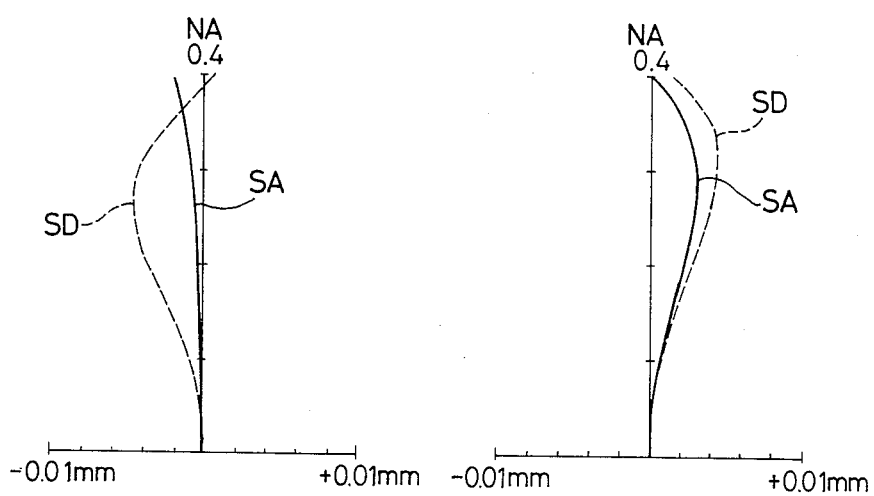
FIG. 12
FIG. 13

OPTICAL COUPLER

BACKGROUND OF THE INVENTION

1. Field of the Invention

The present invention relates to an optical coupler for highly efficiently guiding light from a light source such as a light emitting diode, a semiconductor laser or the like into an optical fiber.

2. Description of the Prior Art

In order to guide scattered light from a light source such as a light emitting diode, a semiconductor laser or the like into a core of an optical fiber through an optical coupler, axial and nonaxial aberrations of a lens constituting the optical coupler must be satisfactorily corrected so as to guide not only axial incident light but also nonaxial incident light due to assembly error or the like. In particular, in the case of a single mode optical fiber, since a core diameter is very small, the lens must satisfy a strict aberration performance requirement. In addition, the optical coupler must be compact light in weight and of low cost. Conventionally, an optical coupler using a graded index lens having parallel surfaces as two end faces is known as an optical coupler of this type.

However, in the case of a graded index lens having parallel surfaces, it is difficult to control the refractive index distribution so as to decrease the axial aberration. Even if the axial aberration becomes small, since the nonaxial aberration, more specifically, a coma is large, light outputted from the light source cannot be focused to a single point when the light source is shifted from the optical axis.

An example of a lens having one spherical surface is disclosed in Japanese Patent Disclosure No. 54-21751. In this lens, the spherical surface is used for correcting only a spherical aberration of the graded index lens. Therefore, although the spherical aberration can be corrected, the coma cannot be corrected.

An optical system which satisfies the above requirements can be constituted by 3 to 4 spherical lenses having a constant refractive index. However, such a combination of spherical lenses results in a large optical system, thus preventing a compact, lightweight system. Since the system has many lenses, assembly of the optical system and grinding of lens surfaces require a large number of steps, resulting in increased cost.

SUMMARY OF THE INVENTION

In order to overcome the above drawbacks, an optical coupler of the present invention comprises a lens for coupling a light source and an optical fiber wherein the lens comprises a transparent column in which a refractive index $n(r)$ at a distance $r$ from an optical axis is expressed by $n^2(r) = n_0^2\{1 - (gr)^2 + h_4(gr)^4 + h_6(gr)^6 + h_8(gr)^8 + \ldots\}$, and satisfies the following conditions when $Sf = g/0.3$:

$$0 < C_1/Sf < 0.67 \quad (1)$$

$$C_2 = 0 \quad (2)$$

$$0 \leq l_1 \cdot Sf \leq 1.5 \quad (3)$$

$$0.5 \leq h_4 \leq 2.0 \quad (4)$$

wherein $C_1$ and $C_2$ are curvatures (inverse numbers of radii of curvatures) output end faces (the sign is positive when the center of the radius of curvature is positioned at the side of the optical fiber with respect to the end face), $l_1$ is a back focus at the side of the light source, $n_0$ is a refractive index on the optical axis, and $g$, $h_4$, $h_6$ and $h_8$ are distribution constants.

Of the conditions (1) to (4), the conditions (1) and (2) indicate that the input end face of a lens facing the light source is a convex spherical surface, and the output end face facing the optical fiber is flat. The optical coupler lens of the present invention has one flat surface, thereby allowing easy grinding and polishing.

The condition (1) indicates that a high-order aberration occurs and the spherical aberration cannot be corrected when $C_1/Sf$ exceeds 0.67. The condition (3) indicates that $C_1/Sf$ becomes large, a high-order aberration occurs and the spherical aberration cannot be corrected, if a sine condition is to be satisfied when $l_1 \cdot Sf$ exceeds 1.5. The condition (4) indicates the range of $h_4$ for correcting the spherical aberration with respect to parameters within the range of the conditions (1) to (4).

When the curvatures of the lens end faces, the back focus at the light source and the distribution constants $g, h_4, \ldots$, are selected to satisfy the conditions (1) to (4), the spherical aberration and coma can be satisfactorily suppressed, as shown in examples to be described later.

BRIEF DESCRIPTION OF THE DRAWINGS

FIGS. 4 to 13 are graphs showing a spherical aberration SA (solid curve) and a sine condition deviation SD (broken curve) of an optical coupler according to examples 1 to 10.

DETAILED DESCRIPTION OF THE PREFERRED EMBODIMENTS

Figure 1:
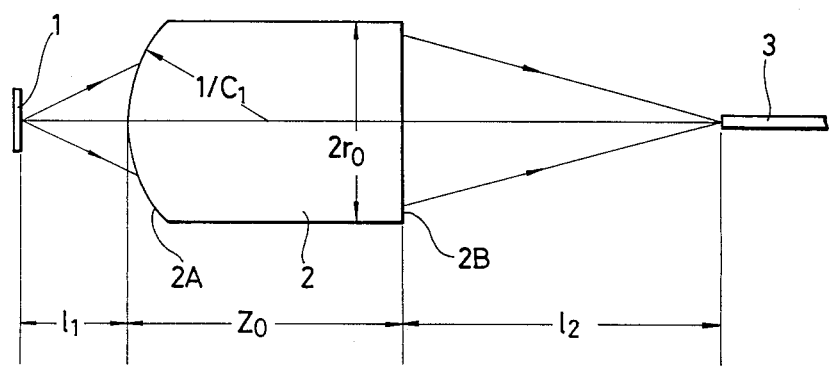
FIG. 1 is a side view showing an example of an optical coupler of the present invention.
Figure 4:
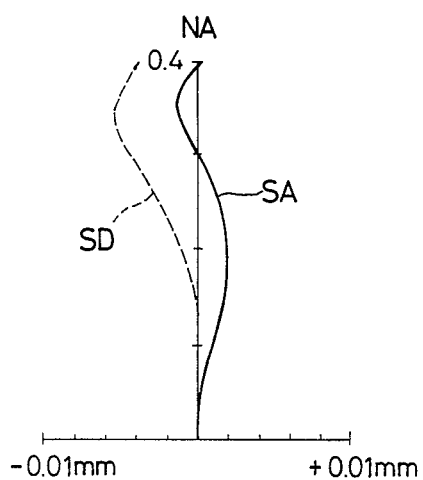
Figure 5:
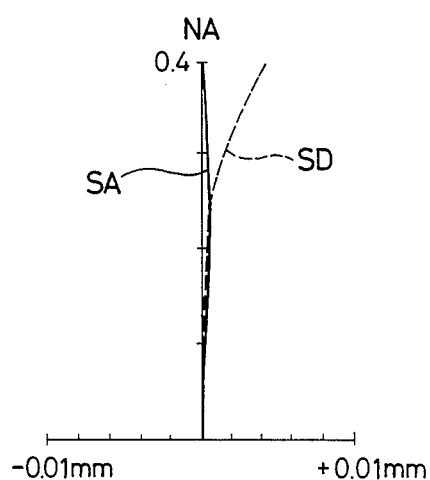

An embodiment of the present invention will be described with reference to the accompanying drawings. Referring to FIG. 1, reference numeral 1 denotes a light source such as a light emitting diode, a semiconductor laser or the like; 2, an optical coupler lens of the present invention; and 3, an optical fiber. The lens 2 is a transparent column comprising a glass, a synthetic resin or the like having a refractive index distribution which continuously changes in accordance with the above-mentioned relations from the central axis to its periphery. An input end face 2 A opposing the light source 1 is an axially symmetrical convex spherical surface, and an output end face 2 B opposing the fiber 3 is a flat surface perpendicular to the optical axis. Scattered light emitted from the light source 1 is focused by the lens 2, and becomes incident into a core of the optical fiber 3.

Figure 2:
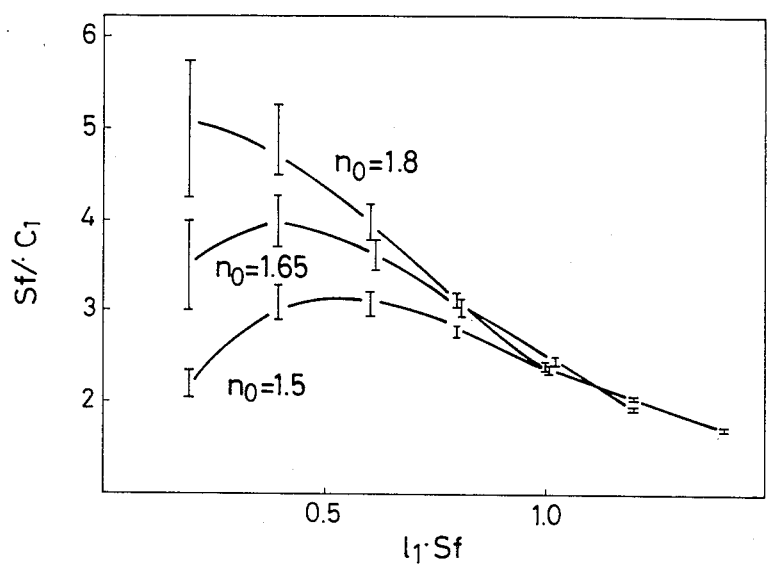
FIG. 2 is a graph showing the relationship between $l_1 \cdot Sf$ and $Sf/C_1$.
Figure 3:
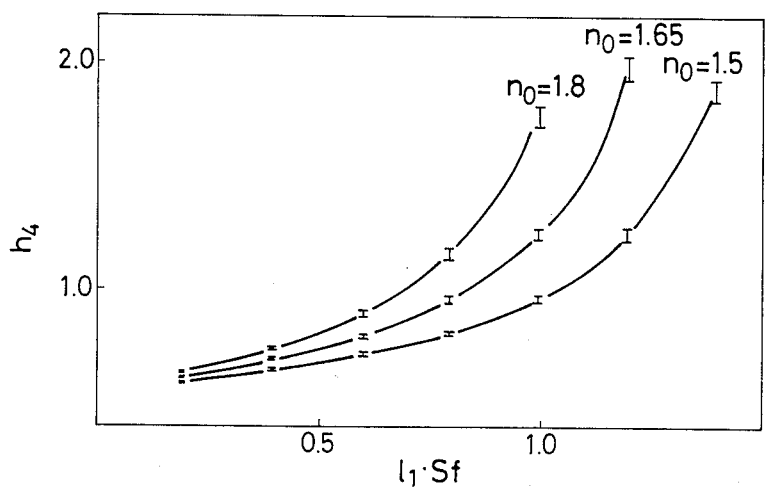
FIG. 3 is a graph showing the relationship between $l_1 \cdot Sf$ and $h_4$.
Figure 6:
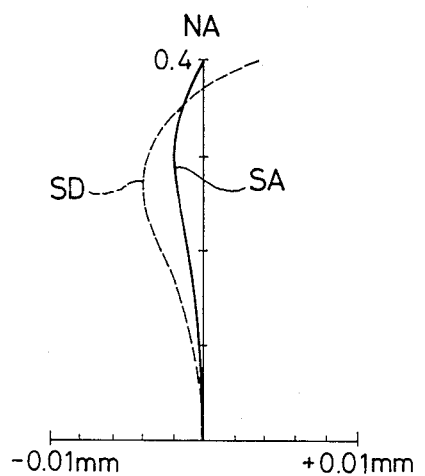
Figure 7:
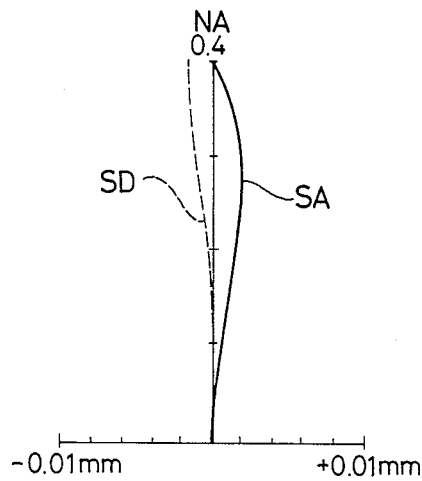
Figure 8:
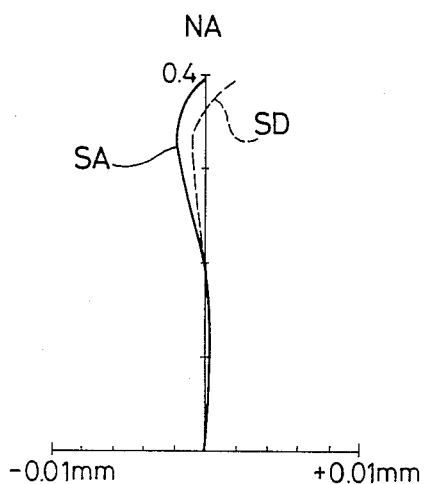
Figure 9:
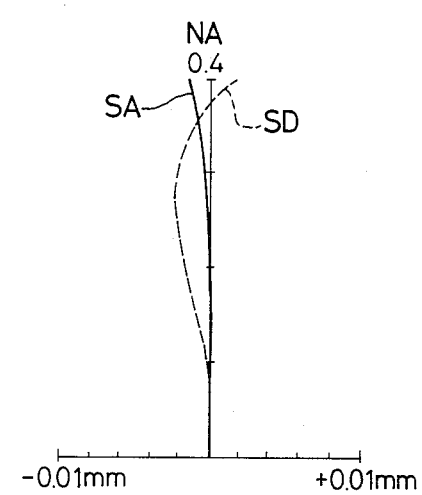

FIGS. 2 and 3 show curves of conditions in which a spherical aberration is sufficently small and the absolute value of a sine condition deviation becomes 0.1% or less when a paraxial lateral magnification is $-3$ and a central refractive index $n_0$ is 1.5, 1.65 and 1.8. Each vertical line in FIGS. 2 and 3 indicates a range of a variation of 0.1% of the absolute value of the sine condition deviation. Referring to FIGS. 2 and 3, reference symbol $C_1$ denotes a curvature of the input end face; $Sf = g/0.3$, $g$ and $h_4$, distribution constants; and $l_1$, a back focus at the side of the light source.

Next, examples 1 to 10 and respective aberration graphs are presented. The unit of length is in millimeters.

EXAMPLE 1
(FIG. 4)

$l_1=1.0$, $n_0=1.627$, $g=0.194$, $h_4=0.81$, $h_6=-0.29$, $h_8=2.90$, $Z_0=8.201$, $C_1=0.1859$, $l_2=8.335$

EXAMPLE 2
(FIG. 5)

$l_1=0.7$, $n_0=1.66$, $g=0.39$, $h_4=1.335$, $h_6=0.749$, $h_8=7.821$, $Z_0=3.370$, $C_1=0.556$, $l_2=5.154$

EXAMPLE 3
(FIG. 6)

$l_1=0.308$, $n_0=1.66$, $g=0.379$, $h_4=0.733$, $h_6=-0.120$, $h_8=1.875$, $Z_0=4.302$, $C_1=0.441$, $l_2=5.713$

EXAMPLE 4
(FIG. 7)

$l_1=0.500$, $n_0=1.66$, $g=0.39$, $h_4=0.928$, $h_6=0$, $h_8=2.81$, $Z_0=3.809$, $C_1=0.453$, $l_2=5.405$

EXAMPLE 5
(FIG. 8)

$l_1=0.822$, $n_0=1.66$, $g=0.379$, $h_4=1.754$, $h_6=1.617$, $h_8=18.705$, $Z_0=3.191$, $C_1=0.615$, $l_2=5.114$

EXAMPLE 6
(FIG. 9)

$l_1=0.800$, $n_0=1.65$, $g=0.3$, $h_4=1.099$, $h_6=0.342$, $h_8=4.238$, $Z_0=4.648$, $C_1=0.389$, $l_2=6.907$

EXAMPLE 7
(FIG. 10)

$l_1=0.300$, $n_0=1.50$, $g=0.3$, $h_4=0.644$, $h_6=-0.123$, $h_8=-0.132$, $Z_0=5.655$, $C_1=0.500$, $l_2=8.007$

EXAMPLE 8
(FIG. 11)

$l_1=1.300$, $n_0=1.50$, $g=0.3$, $h_4=1.958$, $h_6=2.171$, $h_8=35.167$, $Z_0=3.688$, $C_1=0.601$, $l_2=7.174$

EXAMPLE 9
(FIG. 12)

$l_1=0.500$, $n_0=1.60$, $g=0.3$, $h_4=0.77$, $h_6=-0.059$, $h_8=1.021$, $Z_0=5.273$, $C_1=0.360$, $l_2=7.411$

EXAMPLE 10
(FIG. 13)

$l_1=1.000$, $n_0=1.70$, $g=0.3$, $h_4=1.769$, $h_6=1.820$, $h_8=13.446$, $Z_0=4.074$, $C_1=0.469$, $l_2=6.315$

As is apparent from the above examples, the optical coupler of the present invention has very small spherical aberration and coma. Therefore, even if an optical fiber having a very small core diameter such as a single mode optical fiber is used, light emitted from a light can be focused and becomes incident thereon at high efficiency. Since the aberration is small, incident loss is small even if a light source is slightly shifted from the optical axis of the lens due to assembly error or the like. Therefore, since an allowable range of axis alignment is widened, assembly of parts is easy.

Furthermore, since a lens of an optical coupler according to the present invention has a flat surface as one end face, a large number of lenses can be simultaneously surface-grinded, thus allowing easy grinding and low cost mass production.

A lens an optical coupler according to the present invention may be manufactured as follows.

A glass rod is dipped in a molten salt containing potassium ions, for example, potassium nitrate for ion exchange. In this process, thallium ions and sodium ions are solved out through the surface of the glass rod into the molten salt and potassium ions are entered into the glass rod from the molten salt. By this ion exchange process, the concentration of each of thallium ions and sodium ions becomes maximum at the central axis of the rod and decrease gradually to the periphery. The concentration of potassium ions decreases gradually from the periphery to the central axis. By such ion concentration distributions, an index distribution is formed in the glass rod such that the refractive index becomes maximum at the central axis and decreases gradually in proportion to the square of the radial distance from the central axis.

In another method for making a lens of glass of an optical coupler, layers of fine glass particles (soots), the refractive indexes of which are different from one another, are deposited concentrically in order by CVD. The obtained porous cylindrical material is sinterred to form a transparent glass rod, which is drawn with heat.

In a method for making a lens of an optical coupler of synthetic resin, a transparent solid body of a network polymer which has been incompletely polymerized and contains 2 to 80 wt. % of solvent component is prepared. A monomer which forms a polymer having a refractive index different from that of the above network polymer is diffused into the solid body through the surface thereof. Subsequently of or simultaneously with the diffusion process, the polymerizations of the body material and the monomer diffused into the solid body are completed.

What is claimed is:

1. An optical coupler including a lens coupling a light source and an optical fiber wherein the lens comprises a transparent column in which a refractive index $n(r)$ at a radius r from an optical axis in a plane normal to the optical axis is expressed by $n^2(r)=n_0^2\{1-(gr)^2+h_4(gr)^4+[h_6(gr)^6+h_8(gr)^8+]\ldots\}$, and satisfies the following conditions when $Sf=g/0.3$:

$0<C_1/Sf<0.67$ $C_2=0$ $0\leq l_1\cdot Sf\leq 1.5$ $0.5\leq h_4\leq 2.0$ wherein $C_1$ and $C_2$ are curvatures of input and output end faces where a sign is positive when a center of the radius of curvature is positioned at the side of the optical fiber with respect to the end face, $l_1$ is a back focus at the side of the light source, $n_0$ is a refractive index on the optical axis, and g and $h_4$ are distribution constants.

2. An optical coupler according to claim 1, wherein the following conditions are satisfied:

$$0.3 < C_1/Sf < 0.5$$

$$0.3 < l_1 \cdot Sf < 1.3$$

$$0.7 < h_4 < 2.0.$$

3. An optical coupler according to claim 2, in which the refractive index n(r) is expressed by $n^2(r) = n_0^2\{1 - (gr)^2 + h_4(gr)^4 + h_6(gr)^6 + \ldots\}$ and the following conditions are satisfied:

$$0.33 < C_1 < 1.0 \text{ mm}^{-1}$$

$$-5 < h_6 < 10$$

$$1.64 < n_0 < 1.69$$

$$0.34 < gr_0 < 0.37$$

$$0.3 < l_1 < 1.1 \text{ mm}$$

$$2.5 < Z_0 < 4.5 \text{ mm}$$

$$1.75 < 2r_0 < 2.0 \text{ mm}.$$

* * * * *